(12) United States Patent
Kubota et al.

(10) Patent No.: US 9,353,851 B2
(45) Date of Patent: May 31, 2016

(54) OIL STRAINER FOR VEHICLE TRANSMISSION

(71) Applicant: HONDA MOTOR CO., LTD., Tokyo (JP)

(72) Inventors: Eri Kubota, Wako (JP); Naomichi Tonokura, Wako (JP); Kohei Iizuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 14/109,842

(22) Filed: Dec. 17, 2013

(65) Prior Publication Data

US 2014/0166401 A1    Jun. 19, 2014

(30) Foreign Application Priority Data

Dec. 18, 2012   (JP) .................................. 2012-275543

(51) Int. Cl.
*F16H 57/04*    (2010.01)
*F01M 11/00*    (2006.01)

(52) U.S. Cl.
CPC ........ *F16H 57/0443* (2013.01); *F16H 57/0404* (2013.01); *F01M 2011/007* (2013.01)

(58) Field of Classification Search
CPC .............. F16H 57/0443; F16H 57/045; F01M 2011/007; F01M 2011/0075
IPC ...................... F16H 57/04; F01M 11/03, 11/06
See application file for complete search history.

(56) References Cited

U.S. PATENT DOCUMENTS

| | | | | | |
|---|---|---|---|---|---|
| 3,172,581 | A | * | 3/1965 | Nanni ..................... | B65D 88/54 222/405 |
| 3,211,349 | A | * | 10/1965 | Prussin ................... | B65D 83/32 222/402.18 |
| 3,381,709 | A | * | 5/1968 | Pregno ................. | B60K 15/077 137/578 |
| 3,447,258 | A | * | 6/1969 | Moore .................... | A63H 18/12 104/60 |
| 3,477,391 | A | * | 11/1969 | Langford ............... | A63H 18/00 104/73 |
| 4,940,152 | A | * | 7/1990 | Lin .......................... | A61J 9/00 215/11.1 |

(Continued)

FOREIGN PATENT DOCUMENTS

JP    62-288774    12/1987
JP    02-59209 U   4/1990

(Continued)

OTHER PUBLICATIONS

JP2012172803 English Translation.pdf.*

(Continued)

*Primary Examiner* — Minh Truong
(74) *Attorney, Agent, or Firm* — Mori & Ward, LLP

(57) ABSTRACT

An oil strainer for a vehicle transmission includes a body case, a suction port member, a suction port, and a connection tube. The body case contains a filtering member. The suction port member is separated from the body case. The suction port is provided in the suction port member. The connection tube has flexibility or stretchability and connects the body case to the suction port member. The connection tube has a structure which is bent or which is expanded and contracted to allow the suction port member to move while following a change in an oil surface of oil in a transmission casing of the vehicle transmission so that the suction port is not exposed at the oil surface when a position of the oil surface varies due to lean of a vehicle or acceleration/deceleration applied to the vehicle.

3 Claims, 7 Drawing Sheets

(56) References Cited

U.S. PATENT DOCUMENTS

| | | | | |
|---|---|---|---|---|
| 5,186,610 A | * | 2/1993 | Pennington | F04D 13/066 210/242.1 |
| 5,358,644 A | * | 10/1994 | Dennis | B01D 21/2444 137/398 |
| 6,915,818 B2 | * | 7/2005 | Burris | B67D 7/061 137/544 |
| 8,292,036 B2 | * | 10/2012 | Nishida | F16H 57/0402 184/6.2 |

FOREIGN PATENT DOCUMENTS

| | | |
|---|---|---|
| JP | 2002-106316 | 4/2002 |
| JP | 2005-291408 | 10/2005 |
| JP | 2012-172803 | 9/2012 |

OTHER PUBLICATIONS

Japanese Office Action for corresponding JP Application No. 2012-275543, Jun. 12, 2014.

* cited by examiner

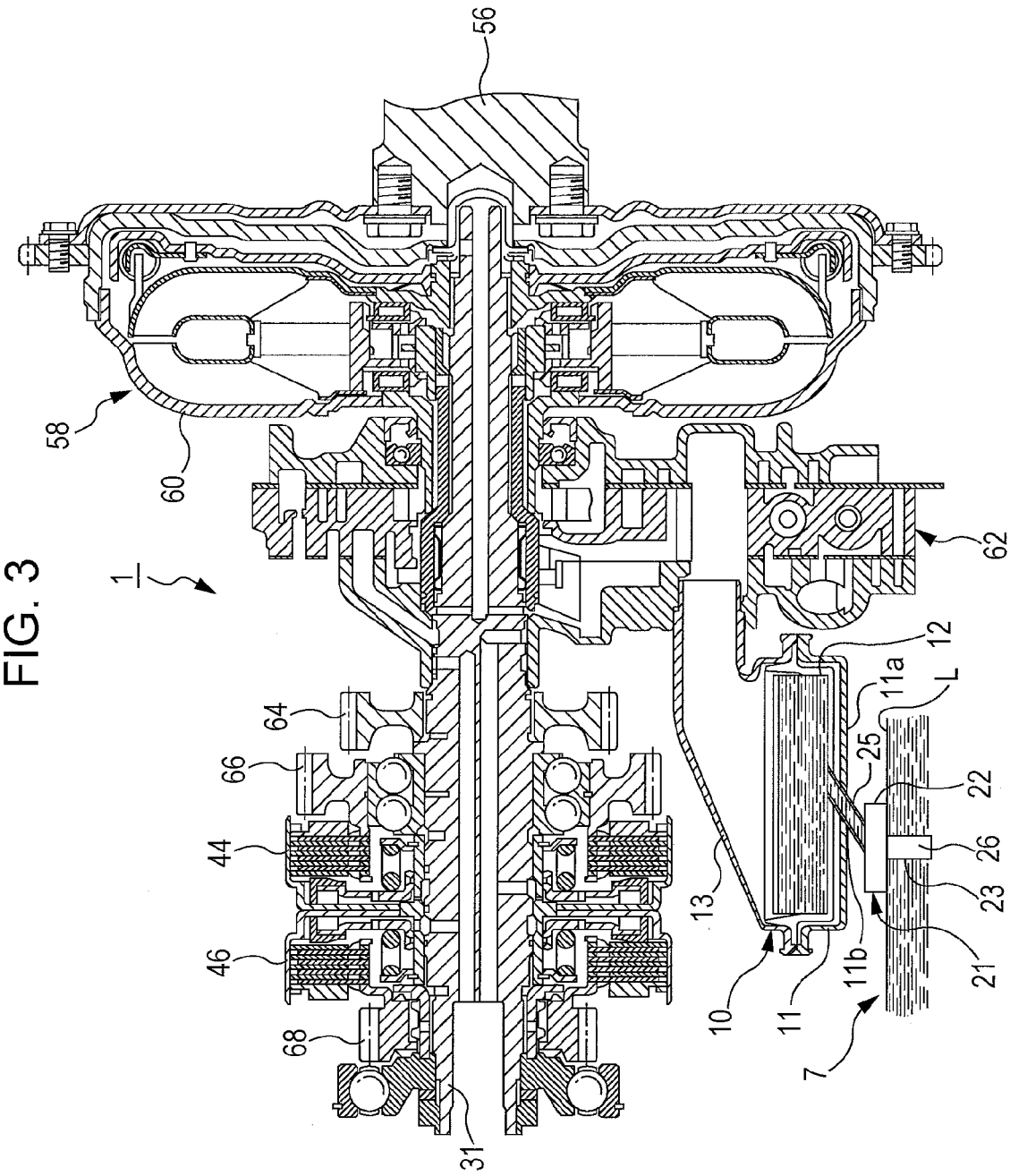

OIL STRAINER FOR VEHICLE TRANSMISSION

CROSS-REFERENCE TO RELATED APPLICATIONS

The present application claims priority under 35 U.S.C. §119 to Japanese Patent Application No. 2012-275543, filed Dec. 18, 2012, entitled "Oil Strainer of Vehicle Transmission." The contents of this application are incorporated herein by reference in their entirety.

BACKGROUND

1. Field

The present disclosure relates to an oil strainer for a vehicle transmission.

2. Description of the Related Art

Oil used as operating oil and lubrication oil for a transmission mounted in a vehicle is stored in an oil reservoir provided in the bottom portion of a transmission casing. The oil stored in the oil reservoir is pumped up by an oil pump. The oil pumped up from the oil reservoir by the oil pump is supplied to components of a transmission mechanism that require lubrication and a valve body of an oil pressure control unit. Thereafter, the oil flows back to the oil reservoir.

The transmission casing has an oil strainer mounted therein. The oil strainer filters the oil drawn by the oil pump (refer to, for example, Japanese Unexamined Patent Application Publication No. 2005-291408). The oil strainer includes a hollow body case (a main body) having a filtering member (a filter) therein and a suction port through which oil is drawn into the body case. By operating the oil pump disposed downstream of the oil strainer, the oil drawn through the suction port is filtered and is delivered to the oil pump.

At that time, the suction port of the oil strainer is an opening formed in, for example, the bottom surface of the body case and remains submerged in oil stored in the transmission casing. However, if the oil is pressed to one side of the transmission casing due to rapid acceleration/deceleration or acceleration in turn during travelling of the vehicle, the suction port may be exposed to the air at the oil surface. Thus, there is a risk of air getting involved in the oil drawn through the suction port (i.e., the occurrence of ventilation).

Therefore, according to an oil strainer of existing transmissions, the amount (the absolute amount) of oil in a transmission casing is increased to prevent the suction port of the oil strainer from being exposed to the air even when the oil is pressed to one side of the transmission casing due to rapid acceleration/deceleration or acceleration in turn during travelling of the vehicle.

SUMMARY

According to one aspect of the present invention, an oil strainer for a vehicle transmission includes a body case, a suction port member, a suction port, and a connection tube. The body case contains a filtering member. The suction port member is separated from the body case. The suction port is provided in the suction port member. The connection tube has flexibility or stretchability and connects the body case to the suction port member. The connection tube has a structure which is bent or which is expanded and contracted to allow the suction port member to move while following a change in an oil surface of oil in a transmission casing of the vehicle transmission so that the suction port is not exposed at the oil surface when a position of the oil surface varies due to lean of a vehicle or acceleration/deceleration applied to the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a longitudinal sectional view of the automatic transmission.

DESCRIPTION OF THE EMBODIMENTS

Figure 1:
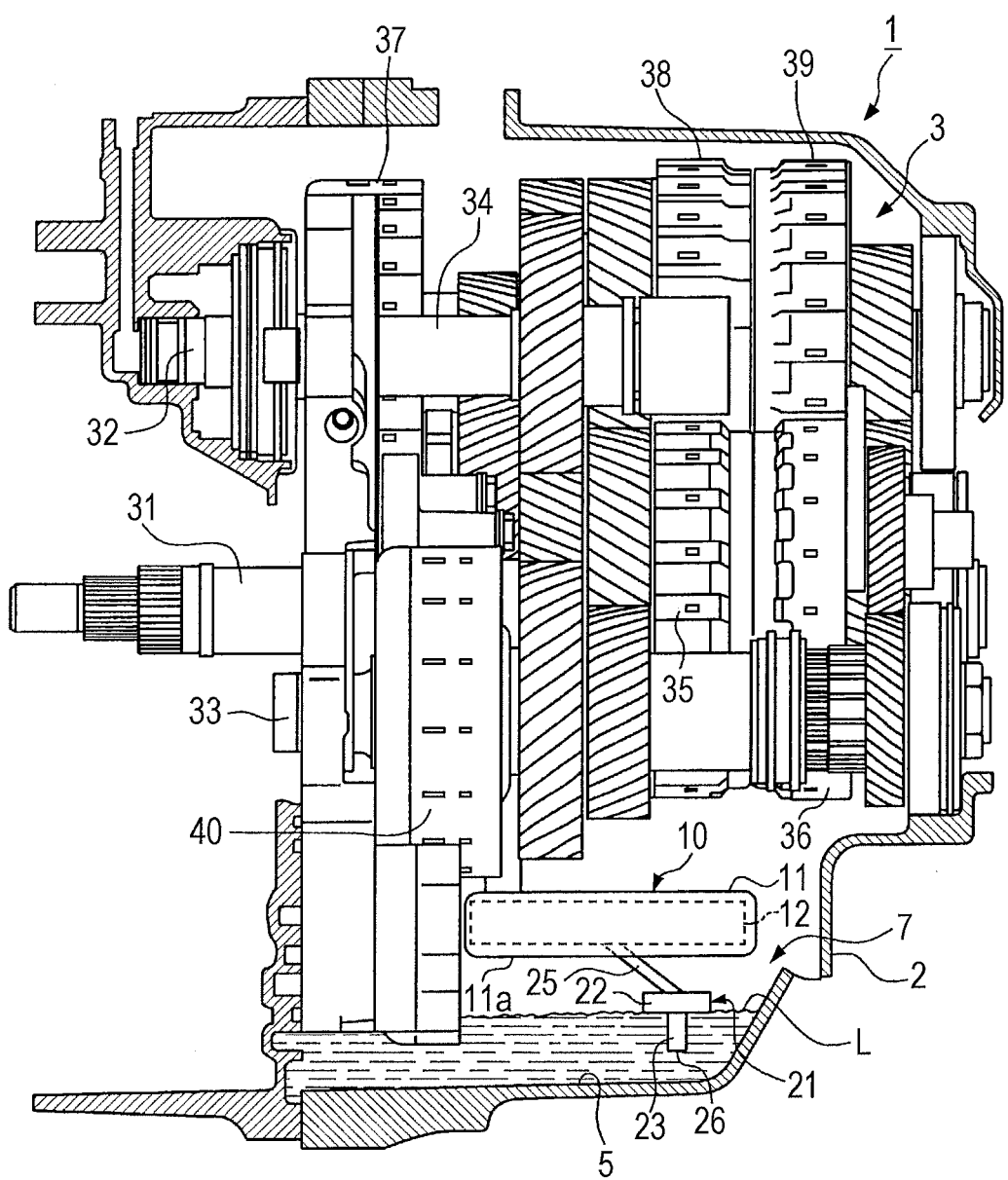
FIG. 1 is a front view of an automatic transmission including an oil strainer according to a first exemplary embodiment of the present disclosure.

The embodiments will now be described with reference to the accompanying drawings, wherein like reference numerals designate corresponding or identical elements throughout the various drawings.

First Exemplary Embodiment

Figure 2:
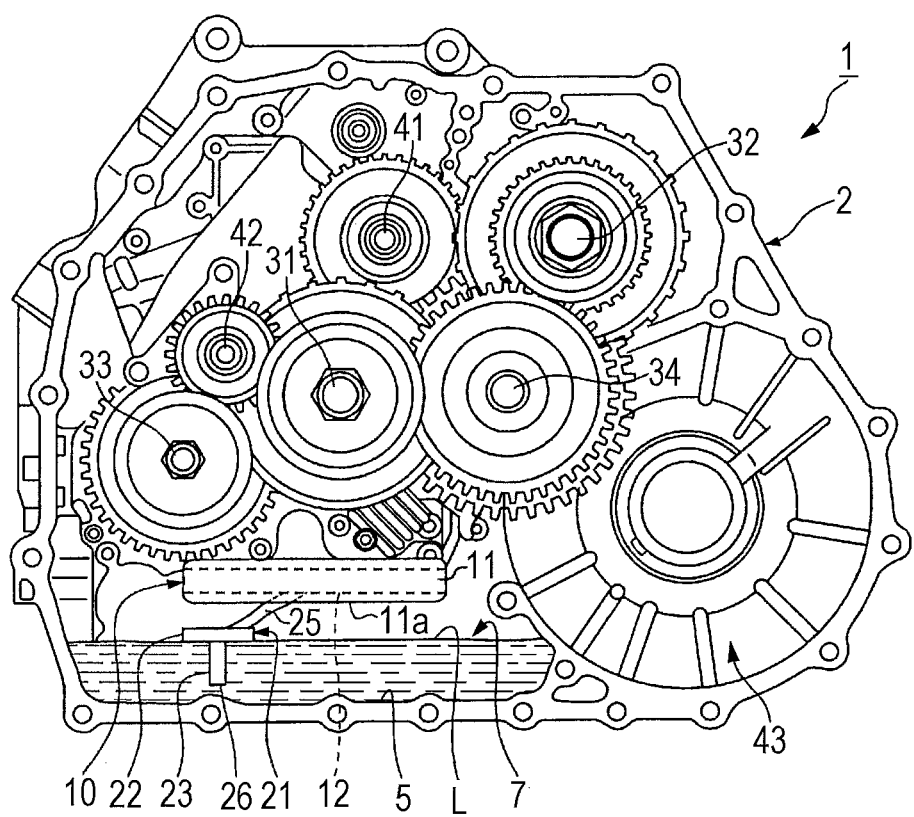
FIG. 2 is a side cross-sectional view of the automatic transmission.

FIGS. 1 to 3 illustrate an automatic transmission 1 including an oil strainer according to a first exemplary embodiment of the disclosure. More specifically, FIG. 1 is a front view of the automatic transmission 1. FIG. 2 is a side cross-sectional view of the automatic transmission 1. FIG. 3 is a longitudinal sectional view of the automatic transmission 1. As illustrated in FIGS. 1 to 3, the automatic transmission 1 is a stepped automatic transmission having a gear mechanism 3 contained in a transmission casing 2. The gear mechanism 3 includes a main shaft 31, a secondary shaft 32, a third shaft 33, and a counter shaft 34 that are disposed parallel to one another. The gear mechanism 3 further includes an idle shaft 41 disposed next to the main shaft 31 and a reverse idle shaft 42 disposed next to the third shaft 33. Note that in FIG. 1, the idle shaft 41 and the reverse idle shaft 42 are not illustrated. Two multiplate wet clutches 35 and 36 are disposed on the main shaft 31. Three multiplate wet clutches 37, 38, and 39 are disposed on the secondary shaft 32. A multiplate wet clutch 40 is disposed on the third shaft 33. As illustrated in FIG. 2, a differential device is installed at an installation position 43.

As indicated by the cross-sectional view of FIG. 3, a communication port 13 of an oil strainer 10 is connected to an oil pump 62. The oil pump 62 is coupled with a crankshaft 56 of an engine (not illustrated) via a casing 60 of a torque converter 58. The oil pump 62 is driven by the engine at all times.

The main shaft 31 has a gear 64 unrotatably secured thereto. The main shaft 31 further has gears 66 and 68 rotatably attached thereto. By engaging a multiplate wet clutch 44, the gear 66 is secured to the main shaft 31. In addition, by engaging a multiplate wet clutch 46, the gear 68 is secured to the main shaft 31.

A portion of the transmission casing 2 from a bottom portion 5 to a predetermined height serves as an oil reservoir 7 that stores oil serving as the lubrication oil or the operating oil. The oil reservoir 7 includes the oil strainer 10. The oil strainer 10 includes a hollow body case 11, a filtering member (an oil filter) 12 for filtering the oil stored in the body case 11, an opening 11b formed in a bottom surface 11a of the body case 11, a suction port member 21 separated from the body case 11, a flexible or stretchy hose (a connection tube) 25 that connects the opening 11b of the body case 11 to the suction port member 21, and a suction port 26 formed in the suction port member 21.

The suction port member 21 includes a free-floating float portion 22 that is formed as a hollow container floating on an oil surface L of the oil stored in the transmission casing 2, a tubular suction pipe 23 that extends from the center of the bottom surface (or first surface) 22a (shown in FIG. 4A) of the float portion 22 downwardly (in the directly downward direction), and a suction port 26 formed at the top end (the lowermost end) of the suction pipe 23. An upper surface (or second surface) 22b (shown in FIG. 4A) of the float portion 22 is connected to the connection tube 25. When the float portion 22 floats on the oil surface L, the suction port 26 remains submerged in the oil. More specifically, since the suction port 26 is placed at a position immediately beneath the float portion 22 at all times due to the weight of the tubular suction pipe 23 when the float portion 22 floats on the oil surface L, the suction port 26 is prevented from being exposed at the oil surface L.

Figure 4A:
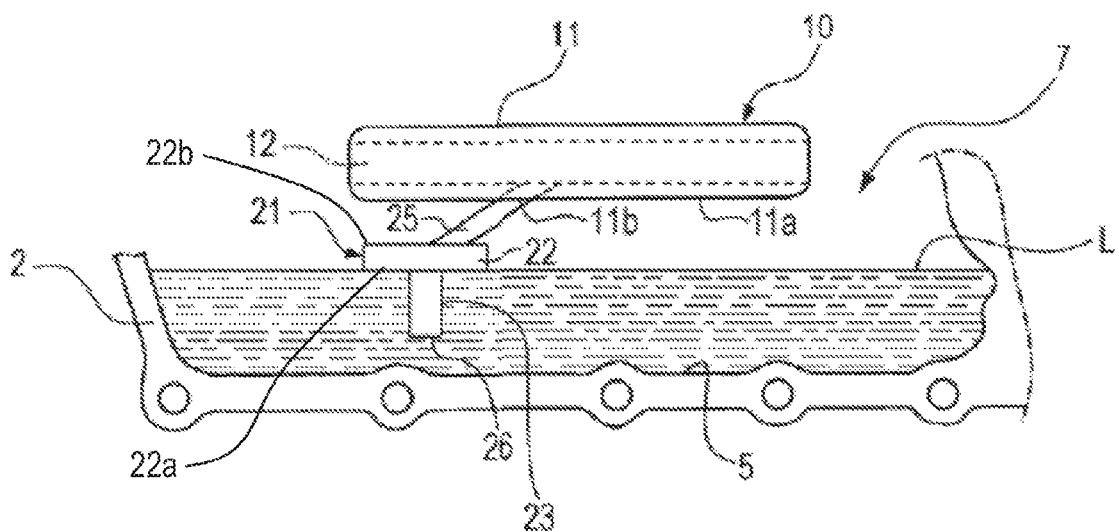
FIGS. 4A and 4B illustrate the operation performed by a suction port member.
Figure 4B:
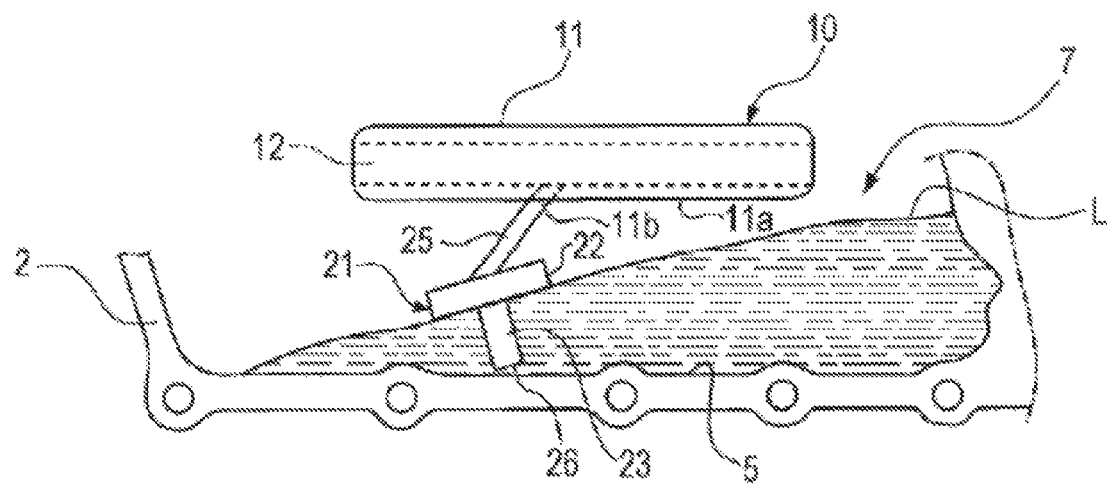

FIGS. 4A and 4B illustrate an exemplary operation performed by the suction port member 21. The suction port member 21 floats on the oil surface L of the oil in the transmission casing 2. In either one of the cases in which the oil surface L is not inclined as illustrated in FIG. 4A and in which the oil surface L is inclined as illustrated in FIG. 4B, the hose 25 is bent, or the hose 25 expands and contracts. Thus, the suction port member 21 moves to follow the oil surface L so that the suction port 26 is not exposed to the air at the oil surface L. In this manner, even when the position of the oil surface L in the transmission casing 2 varies due to lean of the vehicle or acceleration/deceleration applied to the vehicle, the suction port 26 is not exposed at the oil surface L.

Figure 7:
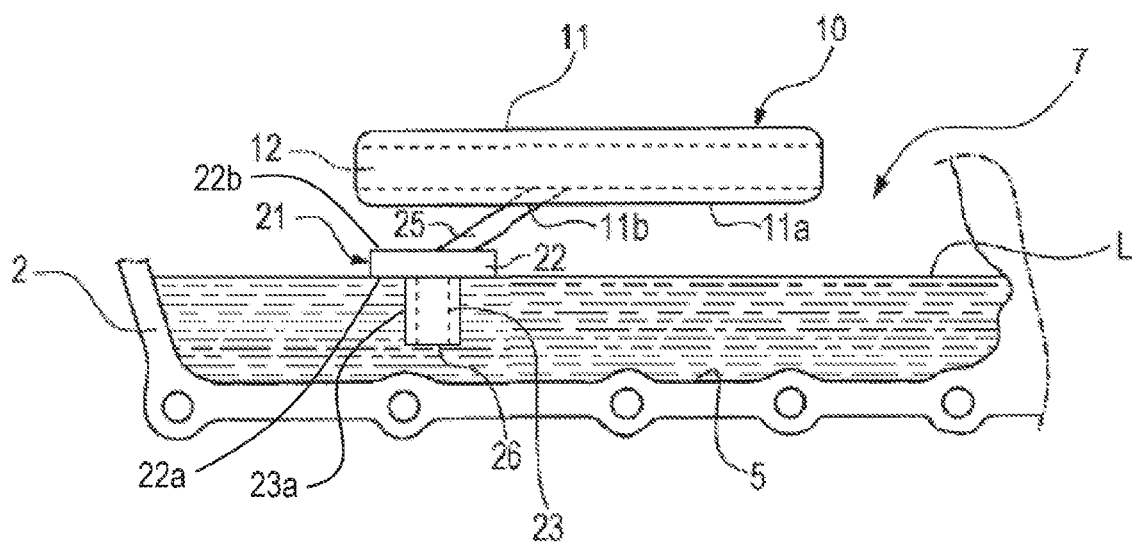
FIG. 7 illustrates an oil strainer according to another exemplary embodiment of the present disclosure.

While the present exemplary embodiment has been described with reference to the structure in which when the float portion 22 floats on the oil surface L, the suction port 26 remains submerged in the oil under the float portion 22 due to the weight of the suction pipe 23 and, thus, the suction port 26 is not exposed at the oil surface L, another member 23a (shown in FIG. 7) having a certain weight may be attached to the suction pipe 23. In such a case, when the float portion 22 floats on the oil surface L, the suction port 26 can remain submerged in the oil under the float portion 22 due to the weight of the member 23a attached to the suction pipe 23.

As described above, according to the present exemplary embodiment, the oil strainer 10 includes the body case 11 containing the oil filter 12, the suction port member 21 separated from the body case 11, and the flexible hose (the flexible connection tube) 25 that connects the body case 11 to the suction port member 21. Thus, the suction port member 21 is separated from the body case 11. In this manner, when the position of the oil surface L in the transmission casing 2 varies due to inclination of the oil surface L caused by lean of the vehicle or acceleration/deceleration applied to the vehicle, the suction port 26 is not exposed at the oil surface L by allowing the suction port member 21 to follow a change in the oil surface L. As a result, even when the position of the oil surface L in the transmission casing 2 varies, the oil can be sucked without allowing air to flow into the oil through the suction port 26.

Accordingly, the amount of oil in the transmission casing 2 can be reduced than in existing automatic transmissions. Thus, the weight of the vehicle and the operating cost of the vehicle can be reduced (weight reduction and cost saving can be achieved). In addition, only an amount of oil that can maintain the minimum required level of the oil surface L can be stored in the transmission casing 2. Accordingly, the stirring resistance of the oil in the transmission casing 2 (the stirring resistance caused by stirring by the gears) can be maintained at a low value. In this manner, the fuel efficiency of the vehicle can be improved. Furthermore, since drawing of air through the suction port 26 (ventilation) can be prevented, the oil pressure can be stably supplied to an oil pressure control unit (not illustrated) that uses the oil stored in the transmission casing 2. As a result, the safety of the vehicle can be improved when the vehicle body behaves so erratically that the oil surface L in the transmission casing 2 varies.

Second Exemplary Embodiment

An oil strainer according to a second exemplary embodiment of the disclosure is described next. Note that the same numbering will be used in describing components of the second exemplary embodiment as was utilized above in describing the first exemplary embodiment, and detailed description of the components are not repeated. The descriptions and the drawings other than those described below are the same as in the descriptions and the drawings provided in the first exemplary embodiment.

Figure 5A:
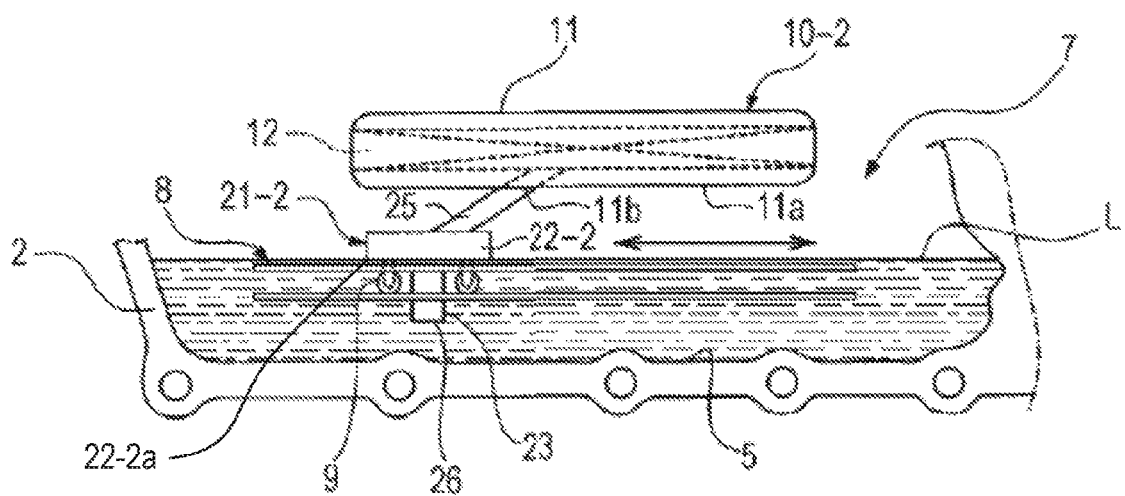
FIGS. 5A and 5B illustrate an oil strainer according to a second exemplary embodiment of the present disclosure.
Figure 5B:
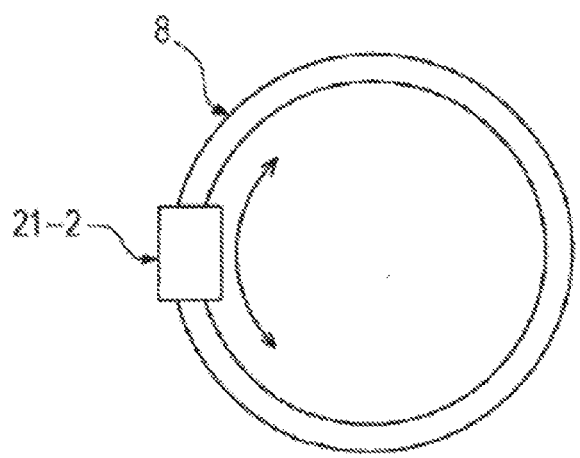

FIGS. 5A and 5B illustrate an oil strainer 10-2 according to the second exemplary embodiment of the present disclosure. According to the second exemplary embodiment, as illustrated in FIG. 5A, a suction port member 21-2 of the oil strainer 10-2 includes a chamber unit 22-2 formed as a hollow container, a suction pipe 23 that protrudes and extends downward at the center of a bottom surface 22-2a of the chamber unit 22-2, and a suction port 26 formed at the top end (the lower end) of the suction pipe 23. In addition, a rail unit 8 is provided in the vicinity of the bottom portion 5 (an inner bottom portion) of the transmission casing 2. The rail unit 8 guides the movement of the suction port member 21-2. FIG. 5B is a plan view illustrating the suction port member 21-2 and the rail unit 8. As illustrated in FIG. 5B, the rail unit 8 is formed so that the track is annular in a plane including the front-rear direction and the width direction of the vehicle. Note that according to the present exemplary embodiment, the rail unit 8 includes two rails arranged in the vertical direction with predetermined spacing therebetween. A rotating body 9 that rolls between the two rails is provided on the "suction port member 21-2" side. In this manner, the suction port member 21-2 can move along the track of the rail unit 8 using rotation of the rotating body 9.

Figure 6A:
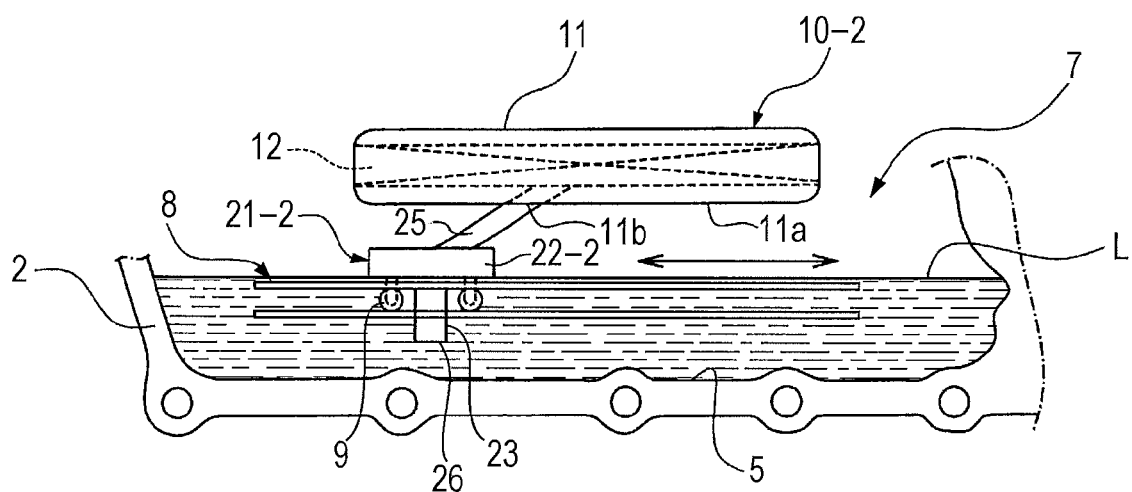
FIGS. 6A and 6B illustrate the operation performed by a suction port member.
Figure 6B:
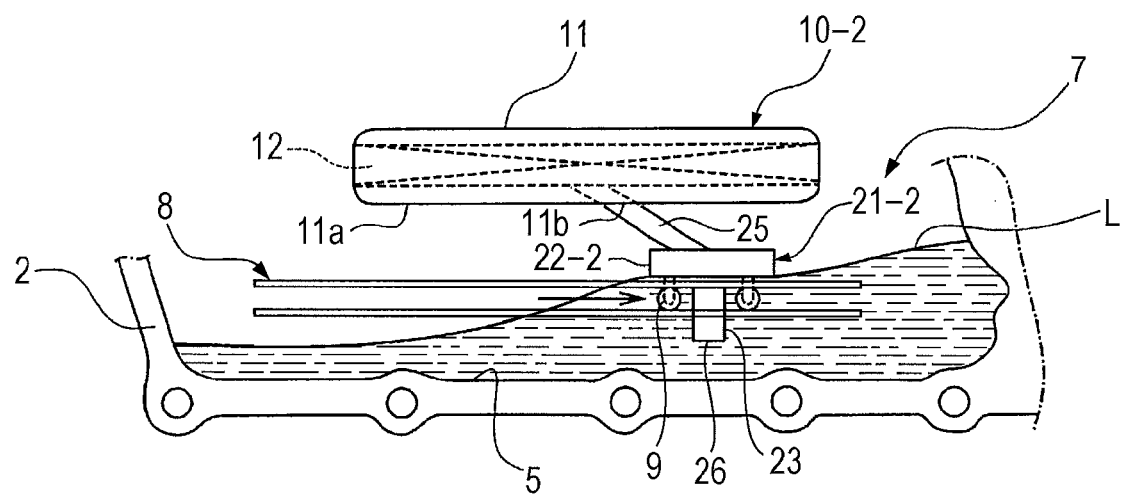

FIGS. 6A and 6B illustrate the operation performed by the suction port member 21-2. The suction port member 21-2 is movable in a circular path along the track of the rail unit 8 in the vicinity of the bottom portion 5 of the transmission casing 2. In either one of the cases in which the oil surface L is not inclined as illustrated in FIG. 6A and in which the oil surface L is inclined as illustrated in FIG. 6B, the hose 25 is bent, or the hose 25 expands and contracts. Thus, the suction port member 21-2 moves to follow the oil surface L so that the suction port 26 is not exposed to the air at the oil surface L. In this manner, even when the position of the oil surface L in the transmission casing 2 varies due to lean of the vehicle or acceleration/deceleration applied to the vehicle, the suction port 26 is not exposed at the oil surface L.

According to the present exemplary embodiment, a suction port member 26-2 of the oil strainer 10-2 includes a chamber unit 22-2 formed as a hollow container and a tubular suction pipe 23 that protrudes and extends from the chamber unit 22-2. The suction pipe 23 has the suction port 26 formed at the top end thereof. In addition, the rail unit 8 is provided in the vicinity of the bottom portion 5 of the transmission casing 2. The rail unit 8 guides the movement of the suction port member 26-2. If the position of the oil surface L varies due to inclination of the oil surface L in the transmission casing 2 caused by lean of the vehicle or acceleration/deceleration applied to the vehicle, the suction port member 26-2 moves along the rail unit 8 and, thus, Thus, the suction port member 26-2 follows the change in the oil surface L. In this manner, even when the position of the oil surface L in the transmission casing 2 is changed, the suction port member 26-2 can suck the oil without allowing air to flow into the oil through the suction port 26.

While the present disclosure has been described with reference to the exemplary embodiments above, the present disclosure is not limited to the above-described exemplary embodiments. Various modifications can be made without departing from the technical scope and principles of this disclosure. For example, the particular configuration of the transmission including the oil strainer having the above-described structure is only an example. A transmission having the oil strainer of the disclosure applied thereto may be a transmission having a configuration other than the above-described configuration.

In addition, for example, the particular shape of the suction port member included in the oil strainer is only an example. A shape of the suction port member other than the above-described shape may be employed.

According to an embodiment of the present disclosure, an oil strainer of a vehicle transmission is provided. The oil strainer (10) is disposed in a transmission casing (2) that stores oil serving as lubrication oil and operating oil for the vehicle transmission to suck the oil in the transmission casing (2) and filter the oil. The oil strainer (10) includes a body case (11) containing a filtering member (12), a suction port member (21) separated from the body case (11), a flexible or stretchy connection tube (25) configured to connect the body case (11) to the suction port member (21), and a suction port (26) formed in the suction port member (21). When the position of an oil surface (L) of the oil in the transmission casing (2) varies due to lean of a vehicle or acceleration/deceleration applied to the vehicle, the connection tube (25) is bent or the connection tube (25) expands and contracts to allow the suction port member (21) to move while following a change in the oil surface so that the suction port (26) is not exposed at the oil surface (L).

According to the oil strainer of the embodiment, by using the body case containing a filtering member, the suction port member separated from the body case, and the flexible connection tube configured to connect the body case to the suction port member, a configuration in which the suction port member is separated from the body case can be achieved. In addition, when the position of an oil surface of the oil in the transmission casing varies due to, for example, inclination of the oil surface in the transmission casing caused by lean of a vehicle or acceleration/deceleration applied to the vehicle, the suction port member moves while following a change in the oil surface so that the suction port is not exposed at the oil surface. In this manner, even when the position of the oil surface in the transmission casing is changed, the suction port member can suck the oil without allowing air to flow into the oil through the suction port.

Accordingly, the amount of the oil stored in the transmission casing can be reduced from that in existing automatic transmissions. Thus, the weight of the vehicle and the operating cost of the vehicle can be reduced (weight reduction and cost saving can be achieved). In addition, only an amount of oil that can maintain the minimum required level of the oil surface can be stored in the transmission casing. Accordingly, the stirring resistance of the oil in the transmission casing (the stirring resistance caused by stirring by the gears) can be maintained at a low value. In this manner, the fuel efficiency of the vehicle can be improved. Furthermore, since drawing of air through the suction port (ventilation) can be prevented, the oil pressure can be stably supplied to an oil pressure control unit. As a result, the safety of the vehicle can be improved when the vehicle body behaves so erratically that the oil surface in the transmission casing varies.

The suction port member (21) according to the embodiment can include a float portion (22) that is formed as a hollow container and that is floatable on the oil surface (L) of the oil in the transmission casing (2) and a tubular suction pipe (23) that protrudes and extends from the float portion (22) and that has the suction port (26) at a top end thereof, and the suction port (26) can remain submerged in the oil when the float portion (22) floats on the oil surface (L). In this manner, even when the position of an oil surface of the oil in the transmission casing varies due to lean of a vehicle or acceleration/deceleration applied to the vehicle, drawing of air through the suction port (ventilation) can be effectively prevented.

The suction pipe (23) according to the embodiment can downwardly extend from the center of a bottom surface of the float portion (22) in a vertical direction, and the suction port (26) can be submerged in the oil under the float portion (22) due to one of a weight of the suction pipe (23) and a weight of another member attached to the suction pipe (23) when the float portion (22) floats on the oil surface (L).

The suction port member (26-2) according to the embodiment can include a chamber portion (22-2) formed as a hollow container and a tubular suction pipe (23) protruding and extending from the chamber portion (22-2) and having the suction port (26) at a top end thereof. A rail unit (8) can be provided in the vicinity of an internal bottom portion (5) of the transmission casing (2) so as to guide the movement of the suction port member (26-2). When the oil surface (L) moves due to lean of a vehicle or acceleration/deceleration applied to the vehicle, the suction port member (26-2) can move along the rail unit (8) due to the lean of a vehicle or the acceleration/deceleration applied to the vehicle to follow a change in the oil surface (L).

In this manner, even when the position of an oil surface of the oil in the transmission casing varies due to lean of a vehicle or acceleration/deceleration applied to the vehicle, drawing of air through the suction port (ventilation) can be effectively prevented using a simplified structure with a small number of parts.

The rail unit (8) according to the embodiment can be formed so that a track thereof is annular in a plane including the front-rear direction and the width direction of the vehicle. Thus, even when the vehicle leans toward either side or when acceleration/deceleration is applied to the vehicle in either direction, the suction port member can follow the oil surface of the oil in the transmission casing using a simplified structure. Accordingly, exposure of the suction port at the oil surface can be effectively prevented.

Note that the above-described reference numerals in parentheses represent the components of the exemplary embodiments described above as examples of the components of the oil strainer according to the present disclosure.

According to the oil strainer of the embodiment for vehicle transmissions, even when the position of an oil surface of the oil in the transmission casing varies due to lean of a vehicle or acceleration/deceleration applied to the vehicle, the oil strainer can suck the oil without allowing air to flow into the oil through the suction port. Thus, the amount of the oil stored in the transmission casing can be reduced from that in existing automatic transmissions. As a result, the weight of the vehicle and the operating cost of the vehicle can be reduced (weight reduction and cost saving can be achieved).

Obviously, numerous modifications and variations of the present invention are possible in light of the above teachings. It is therefore to be understood that within the scope of the appended claims, the invention may be practiced otherwise than as specifically described herein.

What is claimed is:

1. An oil strainer for a vehicle transmission, comprising:
    a body case containing a filtering member;
    a suction port member separated from the body case;
    a suction port provided in the suction port member; and
    a connection tube having flexibility or stretchability and connecting the body case to the suction port member, the connection tube having a structure which is bent or which is expanded and contracted to allow the suction port member to move while following a change in an oil surface of oil in a transmission casing of the vehicle transmission so that the suction port is not exposed at the oil surface when a position of the oil surface varies due to lean of a vehicle or acceleration/deceleration applied to the vehicle,
    wherein the suction port member includes:
        a float portion that has a first surface and a second surface opposite to the first surface; and
        a tubular suction pipe which protrudes directly from the first surface of the float portion and that has an end at which the suction port is provided,
    wherein the connection tube is directly connected to the second surface of the float portion,
    wherein the suction port member includes
        the float portion having a hollow container, and
        the tubular suction pipe protruding from the float portion,
    wherein a rail unit is provided in a vicinity of an internal bottom portion of the transmission casing so as to guide movement of the suction port member,
    wherein, when the oil surface moves due to lean of the vehicle or acceleration/deceleration applied to the vehicle, the suction port member moves along the rail unit due to the lean of the vehicle or the acceleration/deceleration applied to the vehicle to follow a change in the oil surface, and
    wherein the rail unit is provided so that a track of the rail unit extends annularly in a plane parallel to a front-rear direction and a width direction of the vehicle.

2. The oil strainer according to claim 1,
    wherein the suction pipe downwardly extends in a vertical direction from a center of a bottom surface of the float portion, and
    wherein the suction port is submerged in the oil under the float portion due to one of a weight of the suction pipe and a weight of another member attached to the suction pipe in a state where the float portion floats on the oil surface.

3. An oil strainer for a vehicle transmission, comprising:
    a body case containing a filtering member;
    a suction port member separated from the body case, the suction port member including a float portion;
    a suction port provided in the suction port member;
    a connection tube having flexibility or stretchability and connecting the body case to the suction port member, the connection tube having a structure which is bent or which is expanded and contracted to allow the suction port member to move while following a change in an oil surface of oil in a transmission casing of the vehicle transmission so that the suction port is not exposed at the oil surface when a position of the oil surface varies due to lean of a vehicle or acceleration/deceleration applied to the vehicle; and
    a rail unit is provided in a vicinity of an internal bottom portion of the transmission casing so as to guide movement of the suction port member,
    wherein the rail unit is provided so that a track of the rail unit extends annularly in a plane parallel to a front-rear direction and a width direction of the vehicle, and
    wherein, when the oil surface moves due to lean of the vehicle or acceleration/deceleration applied to the vehicle, the suction port member moves along the rail unit due to the lean of the vehicle or the acceleration/deceleration applied to the vehicle to follow a change in the oil surface.

* * * * *